Patented Dec. 26, 1950

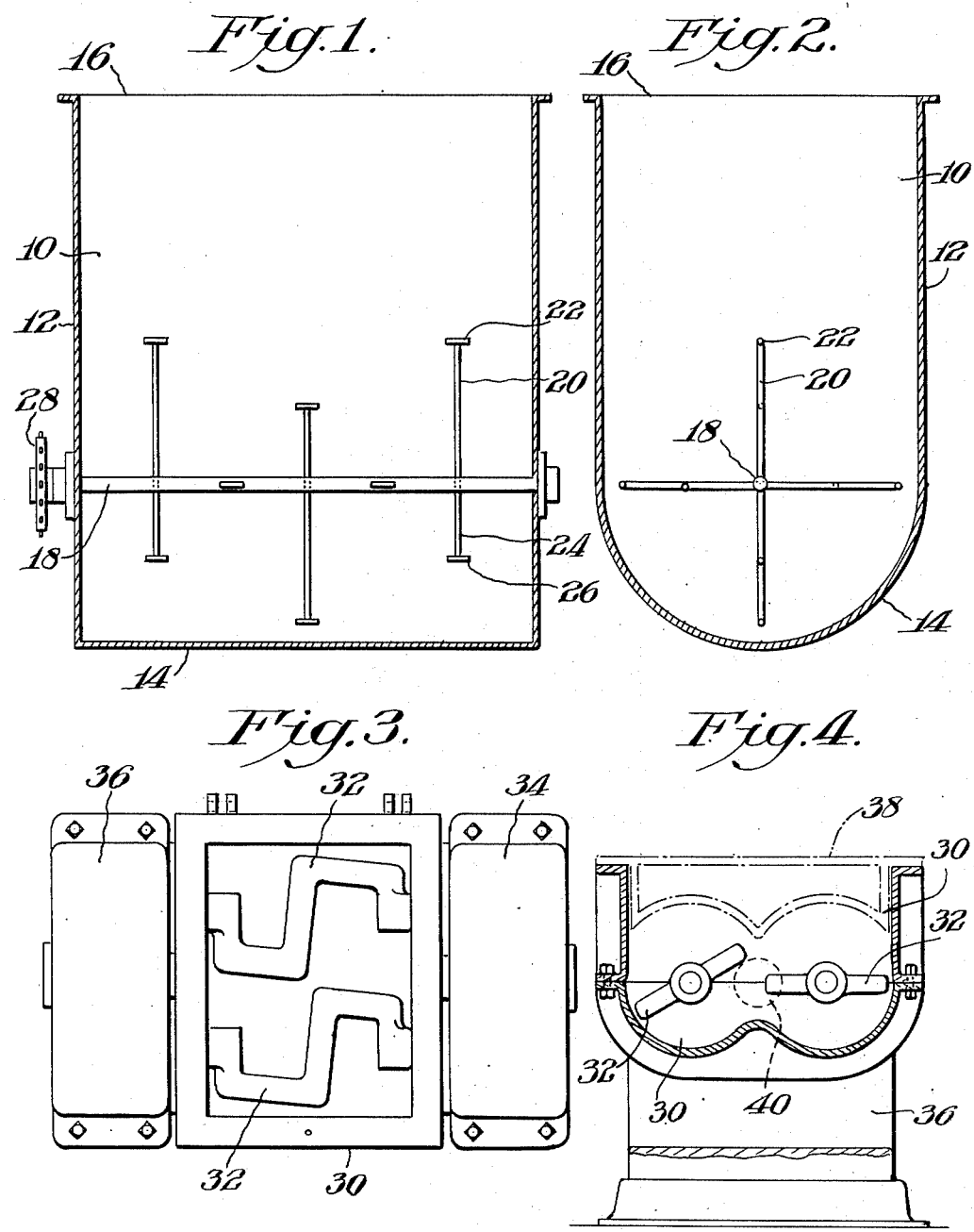

2,535,647

UNITED STATES PATENT OFFICE 2,535,647

TREATING CLAY

Nathan Millman and James Brooks Whitley, Macon, Ga., assignors to J. M. Huber Corporation, Locust, N. J., a corporation of New Jersey Application June 14, 1947, Serial No. 754,726

6 Claims. (Cl. 106—72)

This invention relates to the treatment of clays and particularly to a method for improving the processing quality of clays. The various clays, composed principally of kaolinite, are usually classified as kaolin or china clay. They are used in the arts for various purposes such as pottery manufacture, fillers for water paints, and for the coating of paper. In each of these arts, the workability of the clay slip, and particularly the viscosity of highly concentrated aqueous suspensions, is of very great importance. For example, the machine coating of paper is very greatly facilitated by the use of coating material of high mineral content and low viscosity. Also, the separation of gritty materials from clays is more easily accomplished if the aqueous suspensions are of low viscosity.

Clays, and especially sedimentary or secondary kaolins, from different deposits and even from different parts of the same deposit differ greatly in physical properties when dispersed in water. In some cases, the aqueous suspensions appear to be somewhat bentonitic in character because of their high viscosity. In other cases, slips of the same concentration of clay are fairly fluid, and workable slips of much higher concentration can be prepared. The character of the slips can best be observed by the addition of dried, and preferably ground, clays to water with agitation. Such mixtures become increasingly viscous with increasing amounts of clay and usually are too viscous to pour before as much as 40 volumes of clay have been added to 100 volumes of water. If a small amount of a peptizing agent, such as 0.25% of sodium hexa meta phosphate based on the weight of the clay, is present in the water, fluidity can be retained at a much higher concentration of clay. However, only a relatively few clay slips, containing as much as 85 volumes of clay and a peptizing agent in 100 volumes of water, will flow readily through a 100-mesh screen. Such clays are termed "lean" clays and these are satisfactory for use in the arts for many purposees without further treatment. A great many clay slips, containing 85 volumes of clay and a peptizing agent in 100 volumes of water, will not flow through a 100-mesh screen without shaking, tapping or brushing the screen. Such clays are termed "fatty" clays.

This great difference in the ability of different kaolinitic clays to adsorb or otherwise immobilize water is not well understood. Clays, with such widely different physical characteristics, may have essentially the same ultimate chemical analysis. Careful fractionation of such different clays, in order to produce samples of the same narrow size range, produces samples showing the same differences in physical properties, showing that the differences are due to differences in the clays themselves rather than differences in particle size.

The preparation of kaolinitic clays for many purposes requires the separation of gritty impurities. The first step, in such preparation by a wet process, involves the uniform dispersion of the clay in an aqueous medium. Such dispersions usually contain from about 20 to about 45 lbs. of clay in 100 lbs. of the aqueous suspensions. They are usually prepared by subjecting the clay, water, and a peptizing agent to the action of a rapidly moving agitator, or, in some cases, to grinding in a ball mill. The viscosity of the resulting suspension is such that, when the agitation is discontinued and the suspension is allowed to stand, the heavy particles of hard clay, sand and mica rapidly settle to the bottom and the purified clay suspension may then be decanted and the clay recovered therefrom by any convenient means. The clay, obtained by such processes, produces slips of the same viscous character as the original crude clay from which it was obtained.

It is an object of the present invention to provide kaolinitic clays (clays composed principally of kaolinite) which will produce slips of reduced viscosity. Another object is to provide a method for altering the nature of kaolinitic clays with respect to their ability to produce viscous slips. A further object is to provide a method whereby kaolinitic clays, which produce slips of different viscosity characteristics, may be made more nearly alike in such properties. Other objects are to advance the art. Still other objects will appear hereinafter.

The above and other objects may be accomplished in accordance with our invention which comprises subjecting a mixture of a kaolinitic clay and water to a viscous kneading process under such conditions that considerable heat is generated. More particularly, our process comprises the steps of preparing a mixture of a clay, composed principally of kaolinite, water and a peptizing agent, in the proportions of from about 95 to about 225 volumes of clay to 100 volumes of water and from about 0.05% to about 1% of peptizing agent based on the weight of the clay, and kneading the mixture, without grinding between solid surfaces, at a rate such that the temperature of the mixture rises at a rate of at least 5° C. in 5 minutes and until the temperature of the mixture has been raised at least 5° C. By such treatment, the physical properties of the clay are materially altered so that, when it is employed to prepare a slip, it will produce slips of materially reduced viscosity for the same volume of clay. A fatty clay will be thereby given the characteristics of a lean clay and a lean clay will be rendered more lean. The greatest effect will be apparent in the case of the fatty clays.

The viscous kneading action is accomplished without grinding between solid surfaces. Various types of mixers may be employed such as pug mills, kneaders of the type of dough mixers, and kneaders provided with paddles or pins on a horizontal shaft which rotate within the clay mass. Representative types of mixers which have been employed satisfactorily are shown in the accompanying drawings in which:

Fig. 1 is a vertical longitudinal sectional view of one type of mixer shown somewhat diagrammatically;

Fig. 2 is a vertical cross-sectional view of the mixer of Fig. 1;

Fig. 3 is a plan view of another type of mixer shown somewhat diagrammatically with the cover removed; and Fig. 4 is a vertical cross-sectional view of the mixer of Fig. 3 with the cover in place shown by dot and dash lines.

In the type of mixer shown in Figs. 1 and 2, the mixer comprises a horizontal container 10 having vertical side and end walls 12 and an arcuate bottom 14. The mixer may be open at the top as shown at 16 or may be provided with a cover, if desired. A horizontal shaft 18 extends longitudinally through the container 10 at the center of the arc defined by the bottom 14. Attached to the shaft 18 are long pins 20 with T-shaped ends 22 and oppositely disposed short pins 24 having T-shaped ends 26. The long pins extend to about ⅜ of an inch from the bottom wall 14 while the short pins extend only about ½ the distance from the shaft 18 to the wall 14. The pins are staggered substantially as shown so as to have an action similar to that of a dough mixer. The shaft is shown as provided with a sprocket 28 so that it may be rotated by a chain or similar means. Any other suitable means, such as a pulley and belt or a motor, may be employed for rotating the shaft.

The mixer of Figs. 3 and 4 is an internal type mixer of a character that is well known. It comprises a mixing bowl 30 in which two sigma-type blades 32 are rotated in opposite directions and in overlapping fields of rotation. It is supported in suitable bearing and gear housings 34 and 36 on a rotatable shaft 40 so that it may be tilted for discharging its contents. It may be provided with a suitable cover 38 which conforms closely to the field of rotation of the tops of the blades as shown in dot and dash lines in Fig. 4.

Our process may be employed to advantage with any kaolinitic clay, that is, any clay composed principally of kaolinite. It may be applied to lean clays or fatty clays but is especially beneficial in the treatment of fatty clays. It may be applied to primary kaolins and secondary kaolins. The clay may be treated as obtained from the mine or it may be dried, powdered, degritted, bleached or otherwise treated to improve its purity, color or the like, but should not contain substantial amounts of added materials, and the term "clay, composed principally of kaolinite," as used in the claims will be understood to mean clay devoid of substantial amounts of added materials.

In order to obtain the beneficial results of our invention, it is essential that the mixture contain the proper proportions of clay and water. The mixture should contain from about 95 to about 225 volumes of clay (calculated as dry clay) for each 100 volumes of water. Substantially smaller or larger proportions of clay to water will not produce the desired results. Preferably, the volume of clay to water is so adjusted that the mixture, upon kneading, becomes plastic within five minutes. By plastic, I mean that the mixture assumes the character of a substantially non-crumbly mass of the consistency of a putty which can be deformed without crumbling by the application of pressure but will have little or no tendency to flow under its own weight.

The amount of water required will depend to a small extent on the properties of the clay being treated, different clays requiring slightly different proportions of water. When the mixture of clay and water is first added to the kneading machine, it is usually in the form of a powder or of fairly dry-appearing small lumps. The clay, in such condition, can move away from the mixing elements but, as the kneading is continued, the mixture will begin to knit together and gradually become a coherent mass like putty. If too much water is present, the mass will not assume this putty-like consistency but will be fluid at the end of five minutes and it will be necessary to add more clay. If too little water is present, the clay will continue to tumble in lumps or in a crumbly condition for at least five minutes and it will then be necessary to add small amounts of water until the lumps of clay begin to knit into a coherent putty-like mass. For best results, the proportion of clay to water should be that which produces a plastic mass of the stiffest body. Preferably, we employ a mixture containing from about 115 to about 225 volumes of clay to each 100 volumes of water and, for optimum results, from about 135 to about 210 volumes of clay for each 100 volumes of water.

In order to have the clay mixture knit together properly and particularly in order to operate with the highest proportions of clay to water, it will usually be necessary to have a peptizing agent present in the mixture. The peptizing agent may be any of those ordinarily employed in the blunging of clays. Representative peptizing agents are caustic soda, sodium carbonate, sodium silicate, sodium pyrophosphate, sodium hexa meta phosphate, gum arabic, ammonia and mixtures of any two or more thereof. The amount of peptizing agent will also correspond to that normally employed in the blunging of clays to produce fluid slips and will usually be from about 0.05% to about 1% based on the weight of the clay. The peptizing agent renders the mass more coherent and makes it possible to obtain a plastic mass with the higher proportions of clay to water. In the absence of a peptizing agent, it will usually be impossible to obtain a plastic mass containing more than 110 volumes of clay to 100 volumes of water.

Peptizing agents for clay are substances which, when added in small amounts to a clay slurry, will produce a marked decrease in viscosity. It is generally believed, by those skilled in the art, that the peptizing agents act to deflocculate the aggregates of the clay particles and disperse such particles throughout the aqueous medium. They are otherwise known as "deflocculating agents," "deflocculators," "deflocculants" and "dispersing agents."

The mixture of clay, water and peptizing agent will usually be prepared by mixing dry powdered clay with the desired amount of water containing the peptizing agent dissolved therein. However, the clay may be used in the condition in which it comes from the mine, in which case it will usually contain a substantial amount of water. If such clay does not contain the desired amount of water, additional amounts of water containing the peptizing agent will be added thereto. If the clay contains the desired amount of water, then it will be necessary merely to add the peptizing agent thereto. If the clay contains more water than that desired, then the excess water may be evaporated therefrom and the peptizing agent added. The clay, water and peptizing agent may be mixed in the kneading apparatus or in any other suitable mixer.

When the clay mixture has assumed the condition of a substantially coherent mass, and preferably a plastic mass, it will oppose the motion of the blades of the kneading machine and, upon passage of the blades through the mass, work will be done upon the clay. We have found that in order to obtain the desired improvements in the property of the clay, it is necessary that a definite minimum amount of work be done upon the clay in a definite minimum period of time. If work is done upon the clay mixture at a substantial rate, sensible heat will be generated in the mixture and the amount and rate of the work done can be measured and determined by the amount and rate of heat generated. We have found that it is necessary that work be done upon the clay at such a rate that the temperature of the clay mixture rises at a rate of at least 5° C. in 5 minutes and must be continued at such rate until the temperature of the mixture has been raised at least 5° C. Generally, the clay mixture will be kneaded at such rate for a period of at least 10 minutes in order to obtain the amount of change in the properties of the clay which will be desired for most purposes. It will usually be preferred to continue the kneading at such rate for 30 minutes to an hour or even more in the case of large batches in order to obtain the maximum change in the properties of the clay and to ensure that all portions of the clay mixture have received the desired amount of working.

After the first 5 minutes of kneading at the desired rate, the rate of increase of the temperature of the mixture will rapidly decline and, after 10 minutes, there will be little or no further increase in temperature of the mixture. There is no upper limit of the rate of doing work other than that imposed by the strength of the equipment employed, the amount of the power available and economic considerations. Increasing rates of work will produce increased changes in the properties of the clay. However, work done at increasingly high rates will produce decreasing increments of change. Higher rates of work can be employed to produce a desired amount of change in the properties of the clay in a decreased amount of time.

The rate at which the work is done may be controlled by the speed of operation of the kneading apparatus. The rate of work can also be controlled by the ratio of clay to water employed to produce the plastic mass, that is, by the stiffness of the mass. Mixtures of any particular clay with different amounts of water will give masses of different stiffness and, other things being equal, the rate of work will vary with the stiffness of the mass.

The kneading of the mixture of clay and water will usually be carried out at their normal temperatures, that is, at about atmospheric temperature. Lower and higher temperatures between 0° C. and about 90° C. may be employed, if desired, but without substantial advantage, it merely being necessary that the temperature be such that the water neither freezes nor boils out.

In order to more clearly illustrate our invention, preferred modes of carrying the same into effect and the advantageous results to be obtained thereby, the following examples are given. In these examples the term "brush required" means that the clay slip would not pass through the screen by its weight alone but it was necessary to brush it through the screen.

Example I

The kneader of Figs. 1 and 2 was charged with 6300 grams of a fatty type Georgia kaolin and 1470 grams of water containing 16 grams of sodium hexa meta phosphate. This corresponds to about 160 volumes of clay per 100 volumes of water. The kneader was then operated at 50 revolutions per minute for one hour. After 5 minutes, the temperature of the mixture had increased from 28° C. to 35° C. and, after 10 minutes, a maximum temperature of 38° C. was reached. The clay, after being kneaded, was diluted so that 100 cc. of water contained 25 cc. of clay in suspension. This was permitted to settle for two hours. The upper suspension was decanted and the clay recovered therefrom by filtration and dried.

For purposes of control, a suspension of unkneaded clay containing 25 volumes of clay in 100 volumes of water was treated with 0.25% of sodium hexa meta phosphate and the mixture was blunged with a malted milk mixer. The suspension was settled and the clay recovered exactly as in the case of the kneaded clay and the clay was dried.

Suspensions of each clay, containing 85 volumes of clay in 100 volumes of water containing sodium hexa meta phosphate, were prepared. The kneaded clay strained rapidly through a 100-mesh screen, while the unkneaded clay could be passed through the screen only by brushing. The viscosity of each slip was determined with a Stormer viscometer and the results obtained in terms of radians revolution per second under a load of 200 grams. The control showed a speed of 20 radians per second, while the kneaded clay was much lower in viscosity and gave a speed of 62.5 radians per second.

Example II

A different type of Georgia kaolin was treated as described in Example I and at various concentrations of clay. In each case, the mixing was continued for 60 minutes in the presence of 0.25% of sodium hexa meta phosphate, except for one sample. Slips were then prepared and their viscosities and screening properties measured as in Example I. The results are shown in the following table:

| Vol. of clay in 100 Vol. of water | Temp. rise, °C., after 5 min. | Viscosity in radians per second | Screen Test |
|---|---|---|---|
| 55 | 1 | 6.7 | Brush required. |
| 77 | 1 | 7.5 | Do. |
| 85 | 2 | 9.0 | Do. |
| 95* | 3 | 11.5 | Do. |
| 95 | 4 | 13.3 | Some flow. |
| 105 | 5 | 17.0 | Do. |
| 115 | 5 | 27.0 | Fairly good flow. |
| 140 | 7 | 40.5 | Good flow. |
| 210 | 11 | 56.5 | Do. |

*No peptizing agent used.

Example III

Tests were conducted under the conditions of Example I with samples of kaolinitic clay obtained from various sources in the Georgia-South Carolina area, employing the same peptizing agent and the same proportions of clay, peptizing agent and water. Samples 1, 2 and 3 were fatty clays, samples 6 and 7 were lean clays and samples 4 and 5 were intermediate in type. Slips were prepared and their properties determined as in Example I. The following results were obtained:

| Sample No. | Temp. rise, ° C., in 10 minutes | Visc. in radians per sec. | | Screen Test | |
|---|---|---|---|---|---|
| | | Original | Kneaded | Original | Kneaded |
| 1 | 11 | 6.8 | 53.0 | No flow | Good flow. |
| 2 | 9 | 9.9 | 48.5 | ___do___ | Do. |
| 3 | 9 | 14.3 | 56.1 | Poor flow | Do. |
| 4 | 8 | 26.1 | 54.2 | ___do___ | Do. |
| 5 | 8 | 29.7 | 58.7 | ___do___ | Do. |
| 6 | 8 | 44.6 | 62.3 | Fair flow | Do. |
| 7 | 6 | 57.8 | 68.1 | Good flow | Do. |

Example IV

A test was run in an open internal type mixer of the type shown in Fig. 3. The mixture was peptized with 0.5% of ammonium hydoxide and contained 135 volumes of kaolinitic clay in 100 volumes of water. The blades were operated at 36 revolutions per minute. This type of mixer is relatively inefficient because the clay-water mixture tends to ride above the blades, but, after 30 minutes, the viscosity of the slips prepared from the clay had changed from an original of 18 radians per second to 36 radians per second for the kneaded material.

Example V

The kneader of Example IV was fitted with a cover which conformed closely to the volume of rotation of the top of the blades as shown in Fig. 4. Two charges of the same clay employed in Example IV were run, one with a blade speed of 18 R. P. M. and the second with a blade speed of 65 R. P. M. In each case, the kneading was continued for 10 minutes. In the first case, the temperature rise was 9° C. and, in the second case, 14° C. The viscosity of the slip from the clay kneaded at slow speed was 47 radians per second and the slip from the clay kneaded at high speed gave a viscosity of 58.4 radians per second, when measured under the conditions described in Example I.

Example VI

Georgia kaolin, which gave a slip having an original viscosity of 7.3 radians per second when measured with a Stormer viscometer using a 200 gram load, was passed 10 times through a Raymond laboratory hammermill without added water. The viscosity of a slip, prepared from the clay after this treatment, was 10.1 radians per second. The clay was then kneaded in the machine of Example I in a mixture containing 170 volumes of clay to 100 volumes of water and containing 0.25% of ammonium hydroxide based on the weight of clay. After 5 minutes, the temperature had increased from 27° C. to 36° C. Mixing was continued for 30 minutes. The viscosity of the slip, prepared from the resulting product, was 64 radians per second.

Example VII 6200 grams of primary kaolin were treated with 2355 grams of water and 15 grams of sodium hexa meta phosphate in the apparatus of Example I. After mixing for 10 minutes, the temperature had increased 11° C. The kneaded kaolin was reduced, by addition of water, to a solids content of 65%. A similar slip, containing 65% solids (unkneaded primary kaolin) and the same amount of sodium hexa meta phosphate, was prepared by mixing the constituents with a propeller type agitator. The viscosities were determined with a Stormer viscometer using a 200-gram load. The untreated clay slip had a viscosity of only 16.4 radians while the treated clay slip was much less viscous and had a viscosity of 62 radians.

It will be understood that the foregoing examples have been given for illustrative purposes solely and that my invention is not limited to the specific embodiments disclosed therein. For example, the proportions of clay, water and peptizing agent may be varied within the ranges given in the general description. Other peptizing agents may be employed in place of the sodium hexa meta phosphate and ammonium hydroxide. The clay mixture need not be dried after the kneading operation but may be used directly in the manufacture of clay slips or for other purposes. The clay may be blunged with large volumes of water, degritted and then concentrated to the desired proportion of clay to water before kneading. However, it will generally be preferred to treat the clay according to my process before degritting, and then subject the kneaded clay mixture to a blunging and degritting operation, as the kneaded clay will form more fluid suspensions and can be degritted more readily and completely. While the examples were carried out with the clay mixtures at atmospheric temperatures, higher or lower temperatures may be employed as indicated in the general description of my invention.

From the foregoing description, it will be apparent that, by the use of my invention, the properties of the clay are very materially altered so that it will produce slips and suspensions of a more fluid character, or slips of a desired viscosity which will contain higher concentrations of clay. These improvements in the properties of the clay are of great importance in the art and hence my invention is a valuable contribution to the art.

It is known to the art that, in general, the viscosity of slips, prepared from a given volume of clay, increases with an increase in the amount of fine material in the clay, i. e., with increased surface area of such volume of clay. By our invention, we obtain clay which produces slips of lower viscosity despite the fact that, during the kneading process, a considerable amount of the coarse fraction of the clay is reduced in particle size. The separation of clay of comparable fineness from the same crude unkneaded clay by sedimentation methods does not give a product of reduced viscosity.

We claim:

1. The method of treating clay to improve its processing properties which comprises the steps of preparing a mixture of a clay, composed principally of kaolinite, water and a peptizing agent for the clay, in the proportions of from about 115 to about 210 volumes of clay to 100 volumes of water and from about 0.05% to about 1% of peptizing agent based on the weight of the clay, and kneading the mixture at a rate such that the temperature of the mixture rises at a rate of at least 5° C. in 5 minutes and until the temperature of the mixture has been raised at least 5° C.

2. The method of treating clay to improve its processing properties which comprises the steps of preparing a mixture of a clay, composed principally of kaolinite, water and a peptizing agent for the clay, in the proportions of from about 115 to about 210 volumes of clay to 100 volumes of water and from about 0.05% to about 1% of peptizing agent based on the weight of the clay, the proportions of clay and water being adjusted so that the mixture upon kneading becomes plastic within 5 minutes, and kneading the mixture at a rate such that the temperature of the mixture rises at a rate of at least 5° C. in 5 minutes and until the temperature of the mixture has been raised at least 5° C.

3. The method of treating clay to improve its processing properties which comprises the steps of preparing a mixture of a clay, composed principally of kaolinite, water and a peptizing agent for the clay, in the proportions of from about 115 to about 210 volumes of clay to 100 volumes of water and from about 0.05% to about 1% of peptizing agent based on the weight of the clay, and kneading the mixture at a rate such that the temperature of the mixture rises at a rate of at least 5° C. in 5 minutes for at least 10 minutes.

4. The method of treating clay to improve its processing properties which comprises the steps of preparing a mixture of a clay, composed principally of kaolinite, water and a peptizing agent for the clay, in the proportions of from about 115 to about 210 volumes of clay to 100 volumes of water and from about 0.05% to about 1% of peptizing agent based on the weight of the clay, the proportions of clay and water being adjusted so that the mixture upon kneading becomes plastic within 5 minutes, and kneading the mixture at a rate such that the temperature of the mixture rises at a rate of at least 5° C. in 5 minutes for at least 10 minutes.

5. The method of treating clay to improve its processing properties which comprises the steps of preparing a mixture of a clay, composed principally of kaolinite, water and a peptizing agent for the clay, in the proportions of from about 135 to about 210 volumes of clay to 100 volumes of water and from about 0.05% to about 1% of peptizing agent based on the weight of the clay, and kneading the mixture at a rate such that the temperature of the mixture rises at a rate of at least 5° C. in 5 minutes and until the temperature of the mixture has been raised at least 5° C.

6. The method of treating clay to improve its processing properties which comprises the steps of preparing a mixture of a clay, composed principally of kaolinite, water and a peptizing agent for the clay, in the proportions of from about 135 to about 210 volumes of clay to 100 volumes of water and from about 0.05% to about 1% of peptizing agent based on the weight of the clay, the proportions of clay and water being adjusted so that the mixture upon kneading becomes plastic within 5 minutes, and kneading the mixture at a rate such that the temperature of the mixture rises at a rate of at least 5° C. in 5 minutes for at least 10 minutes.

NATHAN MILLMAN.
JAMES BROOKS WHITLEY.

REFERENCES CITED

The following references are of record in the file of this patent:

UNITED STATES PATENTS

| Number | Name | Date |
|---|---|---|
| 747,443 | Laughray | Dec. 22, 1903 |
| 2,136,264 | Kiesskalt, et al. | Nov. 8, 1938 |
| 2,247,467 | Barker, et al. | July 1, 1941 |
| 2,268,131 | Barker, et al. | Dec. 30, 1941 |
| 2,337,597 | Hall | Dec. 28, 1943 |

FOREIGN PATENTS

| Number | Country | Date |
|---|---|---|
| 214,062 | Great Britain | 1924 |

OTHER REFERENCES

Searle: Refractory Materials (1924), pgs. 99, 100 and 523.